Feb. 25, 1936. J. P. TARBOX 2,031,797
FIXTURE FOR ASSEMBLING RUBBER ARTICULATED JOINTS
Original Filed Feb. 25, 1931

INVENTOR.

Patented Feb. 25, 1936

2,031,797

UNITED STATES PATENT OFFICE

2,031,797

FIXTURE FOR ASSEMBLING RUBBER ARTICULATED JOINTS

John P. Tarbox, Philadelphia, Pa., assignor to Budd Wheel Company, Philadelphia, Pa., a corporation of Pennsylvania Application February 25, 1931, Serial No. 518,057
Renewed September 15, 1933

4 Claims. (Cl. 29—88.2)

My invention relates to the art of assembling rubber sleeves with telescoping metallic members. It is more particularly concerned with the problem of assembling a rubber sleeve with two annularly spaced telescoping metal members in the form of sleeves, in such a manner that the rubber will be held between the metal sleeves in a condition of substantial mass tension. In order to effect the desired mass tension the rubber sleeves are distorted during the act of insertion. Rubber articulated joints of this kind have recently been put to an increasingly large number of uses and the problem of assembling the telescoping members has always presented a delicate problem.

My invention therefore has for its object the provision of a simple and positive method of assembling these parts at a high rate of speed and the development of suitable apparatus to carry out the method. A second object of my invention is to devise a method of assembling the parts in such a manner that the proper alignment of the rubber sleeve and the telescoping metallic members is absolutely assured. A further object has been the development of a suitable assembly fixture and method of using it whereby the metal members may be held in position by gravity during the preparation of the fixture for the actual assembly operation.

The method of the present application is claimed in a copending application of the same applicant, Serial Number 689,683, filed Sept. 15, 1933.

Figure 1:
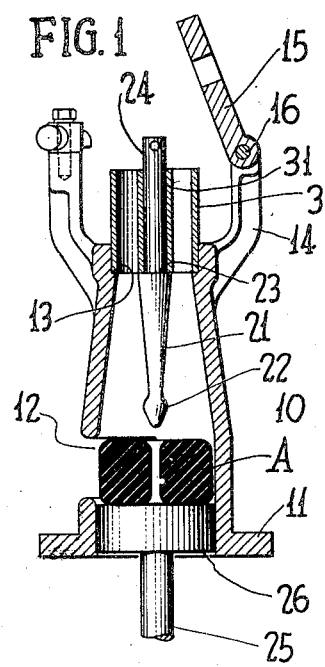
Figure 2:
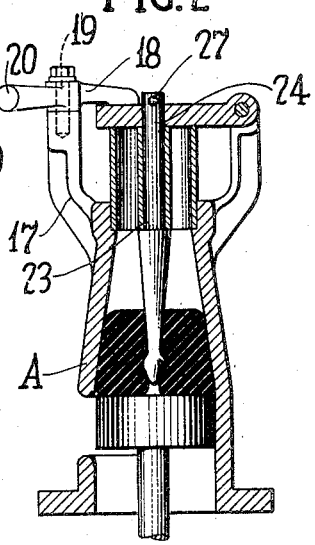

Further objects and advantages of my invention and the manner in which I have achieved them will be obvious from a reading of the subjoined specification in the light of the attached drawing, in which:

Fig. 1 is a central sectional view through my assembly fixture in the first stage of its operation illustrating the first step in the practice of my method, and Figs. 2 to 6 are similar views illustrating the succeeding steps in the practice of my method.

I will first describe the apparatus of my invention and will thereafter describe the method in its relation to the apparatus. These two aspects of my invention are to a large degree independent, but a preliminary description of the apparatus will assist in an understanding of the steps of the method.

Referring to the drawing by reference characters, the numeral 10 indicates a funnel which is flanged adjacent its larger end as indicated at 11 and secured to a suitable base through this flange in inverted vertical position. The funnel is cut away on one of its sides as indicated at 12 to provide a lateral opening for the insertion of rubber sleeves which are destined to become the articulating media between the metallic members of the joints. The upper end of the funnel is provided with a suitable shoulder 13 adapted to provide a seat for an outer metallic sleeve 30. This sleeve is adapted to rest upon the shoulder in proper position for the assembly operation under the influence of gravity.

A bracket 14 extends upwardly and laterally from the upper end of the funnel and is adapted to support an upper abutment plate 15 which is pivoted to the bracket about a horizontal axis 16. A bracket 17 is arranged at a considerable angle circumferentially of the funnel with respect to the bracket 14 and supports a latch 18 which is pivoted thereto about an axis 19. The latch 18 is provided on its outer end with a handle 20 in order to enable it to be easily manipulated.

A cone 21 is provided for coaction with the funnel in the assembly operation, this cone being provided with an enlarged head 22 for purposes which will later appear. The cone is provided adjacent its larger end with a shoulder 23 and a shank 24 extending upwardly from the shoulder. A plunger 25 having a head 26 is aligned with the lower end of the funnel and is adapted to be reciprocated from any suitable source of power in the practice of my method.

In the practice of my method by the apparatus above described, I first insert the outer sleeve 30 in a position in which its lower end rests upon the shoulder 13, as indicated in Fig. 1. I then arrange the inner sleeve 31 adapted to constitute the inner member of the rubber articulated joint about the shank 24 of the cone 21. The telescoped cone and sleeve are next inserted into the position indicated in Fig. 1 and the abutment 15 is swung about its pivot 16 into a position in which it abuts the upper ends of the metallic members. The latch 18 is then swung into position to lock the abutment 15 in place and suitable locking means such as a cotter pin or the like are inserted through the upper shank of the cone, as indicated at 27.

Figure 3:
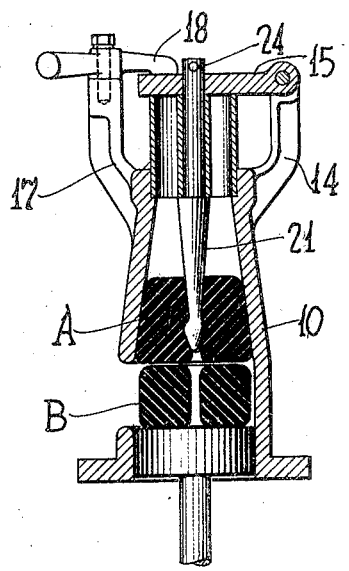
Figure 4:
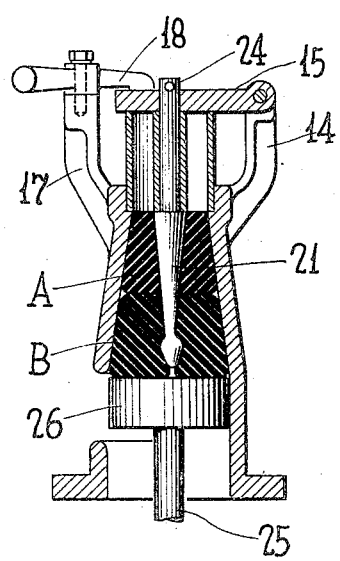
Figure 5:
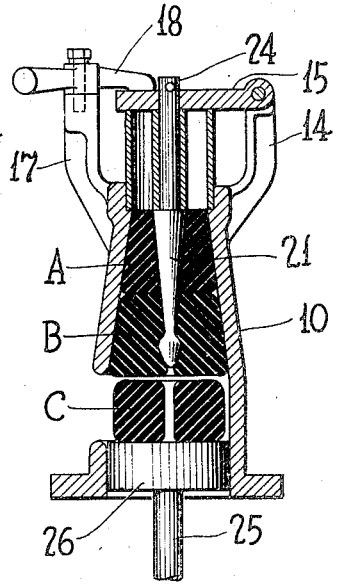
Figure 6:
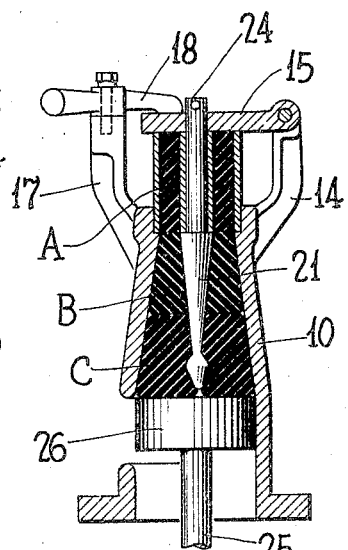

A rubber sleeve is next inserted laterally through the opening 12 in the side of the funnel into a position in which its axis coincides with the axes of the metallic joint members and in which it lies upon the top of the plunger 26. The plunger is now forced upwardly to force the rubber member into the position illustrated in Fig. 2, the rubber being somewhat distorted in its upward movement through the funnel and about the cone. The plunger is now retracted, the rubber member being retained in the position to which it has been forced in the funnel by means of friction assisted by the peculiar shape of the enlarged portion 22 of the cone. A second rubber sleeve B is next inserted laterally as indicated in Fig. 3 and forced upwardly as shown in Fig. 4, this second sleeve in turn forcing the sleeve A further upward within the funnel and about the cone. The plunger is now again retracted and a third sleeve C inserted, as shown in Fig. 5. The next upward stroke of the plunger forces the sleeve A into telescoping relationship within the sleeves 30 and 31 thus completing the manufacture of the first joint.

The abutment plate 15 is now swung upwardly and the first joint is removed from the fixture, and a second pair of sleeves 30 and 31 are placed in aligned telescoping relationship upon the shoulders 13 and 23 of the funnel and cone respectively. The steps illustrated in Figs. 5 and 6 are now again repeated in each successive operation, a new joint being completed upon every reciprocation of the plunger. The locking pin 27 does not need to be used except in the operation illustrated in Figs. 1 and 2, for the cone is held in position within the funnel by means of the rubber sleeves telescoping therewith in all succeeding operations of the machine.

Any suitable lubricant may be employed to facilitate the movement of the rubber sleeves through the funnel and about the cone. In order to prevent the sticking of rubber sleeves within the funnel, I prefer to remove from the funnel all sleeves remaining therein whenever the fixture is left idle for any considerable period of time.

The advantages of my method and apparatus will now be apparent. By arranging both of my metallic sleeves in their final relative positions before the assembly of the rubber sleeve with either, I am enabled to obtain a very accurate alignment of these members which permits me to effect a telescoping movement of the members insuring their correct alignment. The arrangement of my cone in inverted position enables me to place the metal members in position in the assembly fixture and insures their retention in this position by gravity even before the abutment plate 15 is swung into a position in which they are locked. My method of forcing successive rubber sleeves through the assembly fixture by means of the pressure of succeeding sleeves enables me to force these rubber members through the funnel by means of a plunger, an operation which would otherwise be impossible due to the constriction of the smaller end of the funnel.

I wish it to be understood that the relative proportions and the arrangement of parts are merely illustrative of the process and are therefore subject to revision within the scope of my invention. I am fully aware that my process is capable of performance by apparatus other than that illustrated. Both my process and apparatus are capable of still further modifications within the scope of my invention and I do not therefore wish to be limited except by the scope of my sub-joined claims as interpreted in the light of the broad generic spirit of my invention.

I claim:—

1. An apparatus for telescopically fitting together relatively rigid elements one of which circumscribes the other and an intervened annulus of rubber which spaces them apart under substantial radial stress which consists of a funnel through which a plurality of rubber annuli may be forced simultaneously, means cooperating with the funnel for forcing said annuli axially of the funnel, means for internally spreading the rubber annuli and for aligning said elements upon the axis of the funnel and carried by at least one of said elements within the funnel, an abutment movably connected with the funnel and located in its operative position in spaced axial relation to the small end of said funnel and movable from a position axially juxtaposed to the small end to an inoperative position out of axial alignment therewith and means coacting with the movable abutment for locking the relatively rigid elements in their axially aligned positions.

2. Apparatus according to claim 1 in which annuli forcing means comprises a plunger reciprocating axially of the funnel to force the rubber annuli therethrough which plunger has a stroke reaching short of the small end of the funnel by a distance at least equal to the thickness of the rubber annulus about to emerge from the small end of the funnel.

3. Apparatus according to claim 1 in which an opening is provided in one side wall of the funnel for the lateral insertion of rubber annuli to axial position and the means for forcing the annuli through the funnel may be retracted sufficiently to permit such insertion.

4. Apparatus according to claim 1 in which the movable abutment is provided with a supporting and centering connection for the means which engages the inner periphery of the annuli to spread the same.

JOHN P. TARBOX.